US010769182B2

(12) United States Patent
Borios et al.

(10) Patent No.: US 10,769,182 B2
(45) Date of Patent: Sep. 8, 2020

(54) SYSTEM AND METHOD OF HIGHLIGHTING TERMS

(71) Applicant: Apple Inc., Cupertino, CA (US)

(72) Inventors: Guillaume Borios, Cupertino, CA (US); David Chi-Wei Yung, Concord, CA (US); Suma Desu, San Francisco, CA (US); Vipul Ved Prakash, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 305 days.

(21) Appl. No.: 15/275,186

(22) Filed: Sep. 23, 2016

(65) Prior Publication Data
US 2017/0357699 A1 Dec. 14, 2017

Related U.S. Application Data

(60) Provisional application No. 62/348,835, filed on Jun. 10, 2016.

(51) Int. Cl.
G06F 16/332 (2019.01)
G06F 16/33 (2019.01)

(52) U.S. Cl.
CPC ...... G06F 16/3322 (2019.01); G06F 16/3334 (2019.01)

(58) Field of Classification Search
CPC ........... G06F 17/3064; G06F 17/30663; G06F 16/3322; G06F 16/3334
See application file for complete search history.

(56) References Cited

U.S. PATENT DOCUMENTS

| 5,799,268 | A | 8/1998 | Boguraev |
| 6,026,388 | A | 2/2000 | Liddy et al. |
| 7,516,124 | B2 | 4/2009 | Kasperski |
| 8,423,538 | B1 * | 4/2013 | Sadikov ................. G06N 7/005 707/722 |
| 8,494,281 | B2 * | 7/2013 | Nagarajan ............ G06K 9/2054 358/403 |
| 8,989,713 | B2 | 3/2015 | Doulton |
| 9,043,367 | B2 | 5/2015 | Green et al. |
| 9,235,654 | B1 | 1/2016 | Gupta et al. |
| 9,294,890 | B1 | 3/2016 | Boutcher et al. |
| 9,436,951 | B1 * | 9/2016 | Jablokov ............... G06F 16/951 |
| 9,558,165 | B1 | 1/2017 | Marsten et al. |
| 2003/0023624 | A1 | 1/2003 | Hamilton, II et al. |

(Continued)

Primary Examiner — Richard L Bowen
(74) Attorney, Agent, or Firm — Womble Bond Dickinson (US) LLP

(57) ABSTRACT

A method and apparatus of a device that links a term in an application running on a device to a predictive search query is described. In one embodiment, the device receives a plurality of key terms from a key terms server, wherein each of the plurality of key terms is associated with the predictive search query. For each of the plurality of application terms, the device determines if there is a matching key term for this application term with at least one of the plurality of key terms. The device further receives an indication that a user has selected the matching key term. In addition, the device requests a query search to a search server using the predictive search query associated with the matching key term. Furthermore, the device receives a query search result from the query search server and presents the query search results to the user of the device.

20 Claims, 15 Drawing Sheets

(56) References Cited

U.S. PATENT DOCUMENTS

| | | | |
|---|---|---|---|
| 2005/0289168 A1 | 12/2005 | Green et al. | |
| 2006/0156222 A1 | 7/2006 | Chi et al. | |
| 2009/0058820 A1* | 3/2009 | Hinckley | G06F 3/017 345/173 |
| 2009/0327267 A1* | 12/2009 | Wong | G06F 16/2425 |
| 2010/0153106 A1 | 6/2010 | Frazier et al. | |
| 2010/0223133 A1 | 9/2010 | Scott et al. | |
| 2010/0223279 A1 | 9/2010 | Scott | |
| 2011/0213655 A1 | 9/2011 | Henkin et al. | |
| 2011/0252023 A1 | 10/2011 | Santamaria et al. | |
| 2011/0320443 A1* | 12/2011 | Ray | G06F 16/951 707/723 |
| 2012/0127080 A1 | 5/2012 | Kushler et al. | |
| 2012/0245925 A1 | 9/2012 | Guha et al. | |
| 2012/0246178 A1* | 9/2012 | Holsman | G06F 16/95 707/751 |
| 2012/0254233 A1* | 10/2012 | Nose | G06F 17/30864 707/769 |
| 2012/0290909 A1* | 11/2012 | Speirs | G06F 17/30876 715/205 |
| 2012/0290950 A1 | 11/2012 | Rapaport et al. | |
| 2012/0330946 A1* | 12/2012 | Arredondo | G06F 16/24575 707/728 |
| 2013/0106894 A1 | 5/2013 | Davis et al. | |
| 2013/0138696 A1 | 5/2013 | Turdakov et al. | |
| 2013/0185074 A1 | 7/2013 | Gruber et al. | |
| 2013/0253910 A1 | 9/2013 | Turner et al. | |
| 2014/0214526 A1* | 7/2014 | Ramer | G06Q 30/0273 705/14.42 |
| 2014/0337370 A1 | 11/2014 | Aravamudan et al. | |
| 2014/0337740 A1 | 11/2014 | Kwon et al. | |
| 2014/0372402 A1* | 12/2014 | Chiu | G06F 16/951 707/706 |
| 2014/0380169 A1 | 12/2014 | Eldawy | |
| 2015/0100562 A1 | 4/2015 | Kohlmeier et al. | |
| 2015/0169576 A1 | 6/2015 | Panda | |
| 2015/0271111 A1 | 9/2015 | Dowdell | |
| 2015/0310487 A1 | 10/2015 | Xu et al. | |
| 2015/0363485 A1 | 12/2015 | Bennett et al. | |
| 2016/0048326 A1* | 2/2016 | Kim | G06F 3/04886 715/773 |
| 2016/0057609 A1 | 2/2016 | Nebel | |
| 2016/0063093 A1* | 3/2016 | Boucher | G06F 17/3097 707/748 |
| 2016/0202943 A1* | 7/2016 | Choi | G06F 3/04884 715/753 |
| 2017/0132019 A1 | 5/2017 | Karashchuk et al. | |
| 2017/0142036 A1 | 5/2017 | Li et al. | |
| 2017/0206190 A1* | 7/2017 | Satterfield | G06F 17/2765 |

\* cited by examiner

SYSTEM AND METHOD OF HIGHLIGHTING TERMS

RELATED APPLICATIONS

Applicant claims the benefit of priority of prior, provisional application Ser. No. 62/348,835, filed Jun. 10, 2016, the entirety of which is incorporated by reference.

FIELD OF INVENTION

This invention relates generally to search technology and more particularly to generating and highlighting key terms that are used for a search.

BACKGROUND OF THE INVENTION

A user will often perform a query search to lookup information on the Web or from some other data sources. A query search begins with a client receiving the query string, which is sent to a search server. The search server receives query string and searches a search index for results that match this query string. The search server then returns the results to the client.

In this scheme, in order to do a search, the user needs to enter a query string that is used for the search request. As the user starts to enter the query string, the client may provide query completions that are based on the query prefix entered by the user. The client, however, does not suggest types of query strings to use for a search based on the types of terms being presented to the user via one or more user interfaces for one or more running applications of the client. For example, a user may be interacting with one or more other people using a messaging application discussing plans for going out (e.g., seeing a movie, finding a restaurant, etc.). The text of the messaging application may include terms for certain movies to see or restaurants to go to. If the user wishes to make a search about these movies or restaurants, the user will need to enter the query search string to perform a search for these movies or restaurants.

SUMMARY OF THE DESCRIPTION

A method and apparatus of a device that links a term in an application running on a device to a predictive search query is described. In one embodiment, the device receives a plurality of key terms from a key terms server, wherein each of the plurality of key terms is associated with the predictive search query. For each of the plurality of application terms, the device determines if there is a matching key term for this application term with at least one of the plurality of key terms. The device further receives an indication that a user has selected the matching key term. In addition, the device requests a query search to a search server using the predictive search query associated with the matching key term. Furthermore, the device receives a query search result from the query search server and presents the query search results to the user of the device.

In another embodiment, a machine-readable medium that contains executable program instructions which when executed by a data processing device cause the device to perform a method to link a term in an application running on a device to a predictive search query is described. In this embodiment, the machine-readable medium receives a plurality of key terms from a key terms server, wherein each of the plurality of key terms is associated with the predictive search query. For each of the plurality of application terms, the machine-readable medium determines if there is a matching key term for this application term with at least one of the plurality of key terms. The machine-readable medium further receives an indication that a user has selected the matching key term. In addition, the machine-readable medium requests a query search to a search server using the predictive search query associated with the matching key term. Furthermore, the machine-readable medium receives a query search result from the query search server and presents the query search results to the user of the device.

In this embodiment, each of the plurality of application terms is presented via a user interface of the application. In addition, each of the plurality of key terms is selected from the group consisting of an unambiguous key and an ambiguous key term. An unambiguous key matches one of the plurality of application terms without a contextual analysis, whereas a ambiguous key matches one of the plurality of application terms using a contextual analysis. In this embodiment, each of the plurality of key terms includes a term text, base score, decay function, and a threshold.

The method of machine-readable medium further matches the term text to a matching one of the plurality of key terms and performs a contextual analysis of the application term using the decay function of the matching key term. This method also determines a term score of the application term using the base score of the matching key term and compares the term score with a threshold for the matching key score. The contextual analysis uses a set of contextual terms of a search domain associated with the matching key term. In addition, the matching key term is associated with multiple search domains. This method further overlays the search results over the user interface of the application.

In one embodiment, a method to link a term in an application running on a device to a predictive search query is described. In this embodiment, the machine-readable medium receives a plurality of key terms from a key terms server, wherein each of the plurality of key terms is associated with the predictive search query. For each of the plurality of application terms, the machine-readable medium determines if there is a matching key term for this application term with at least one of the plurality of key terms. The machine-readable medium further receives an indication that a user has selected the matching key term. In addition, the machine-readable medium requests a query search to a search server using the predictive search query associated with the matching key term. Furthermore, the machine-readable medium receives a query search result from the query search server and presents the query search results to the user of the device.

In this embodiment, each of the plurality of application terms is presented via a user interface of the application. In addition, each of the plurality of key terms is selected from the group consisting of an unambiguous key and an ambiguous key term. An unambiguous key matches one of the plurality of application terms without a contextual analysis, whereas an ambiguous key matches one of the plurality of application terms using a contextual analysis. In this embodiment, each of the plurality of key terms includes a term text, base score, decay function, and a threshold.

The method further matches the term text to a matching one of the plurality of key terms and performs a contextual analysis of the application term using the decay function of the matching key term. This method also determines a term score of the application term using the base score of the matching key term and compares the term score with a threshold for the matching key score. The contextual analysis uses a set of contextual terms of a search domain associated with the matching key term. In addition, the matching key term is associated with multiple search domains. This method further overlays the search results over the user interface of the application.

A machine-readable medium that contains executable program instructions which when executed by a data processing device cause the device to perform a method to gather a plurality of key terms is described. In an exemplary embodiment, the machine-readable medium receives a plurality of terms and selects a plurality of key terms from the plurality of terms, wherein each of the plurality of key terms is a term that is highlighted in a running application. The machine-readable medium additionally sends the plurality of key terms to a plurality of devices, where each of the plurality of devices matches at least one of the plurality of key terms in that device and the predictive search query is executed when that term is found in a running application and the user selects this term in the running application.

In addition, the predictive search query is executed over multiple search domains. Each of the plurality of key terms is selected from the group consisting of an unambiguous key and an ambiguous key term. Furthermore, An unambiguous key matches one of the plurality of application terms without a contextual analysis, whereas an ambiguous key matches one of the plurality of application terms using a contextual analysis. In this embodiment, each of the plurality of key terms includes a term text, base score, decay function, and a threshold.

In one embodiment, the machine-readable medium further determines the decay function and threshold for each of the plurality of key terms. In addition, at least one of the plurality of key terms is associated with multiple search domains. The ambiguous key term associated with a search domain and the search domain includes a set of contextual terms used for the contextual analysis. Furthermore, the plurality of key terms is specific for at least one of a locale and a language.

In one embodiment, a method that gathers a plurality of key terms is described. In an exemplary embodiment, the method receives a plurality of terms and selects a plurality of key terms from the plurality of terms, wherein each of the plurality of key terms is a term that is highlighted in a running application. The method additionally sends the plurality of key terms to a plurality of devices, where each of the plurality of devices matches at least one of the plurality of key terms in that device and the predictive search query is executed when that term is found in a running application and the user selects this term in the running application.

In addition, the predictive search query is executed over multiple search domains. Each of the plurality of key terms is selected from the group consisting of an unambiguous key and an ambiguous key term. Furthermore, an unambiguous key matches one of the plurality of application terms without a contextual analysis, whereas an ambiguous key matches one of the plurality of application terms using a contextual analysis. In this embodiment, each of the plurality of key terms includes a term text, base score, decay function, and a threshold.

In one embodiment, the method further determines the decay function and threshold for each of the plurality of key terms. In addition, at least one of the plurality of key terms is associated with multiple search domains. The ambiguous key term associated with a search domain and the search domain includes a set of contextual terms used for the contextual analysis. Furthermore, the plurality of key terms is specific for at least one of a locale and a language.

Other methods and apparatuses are also described.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
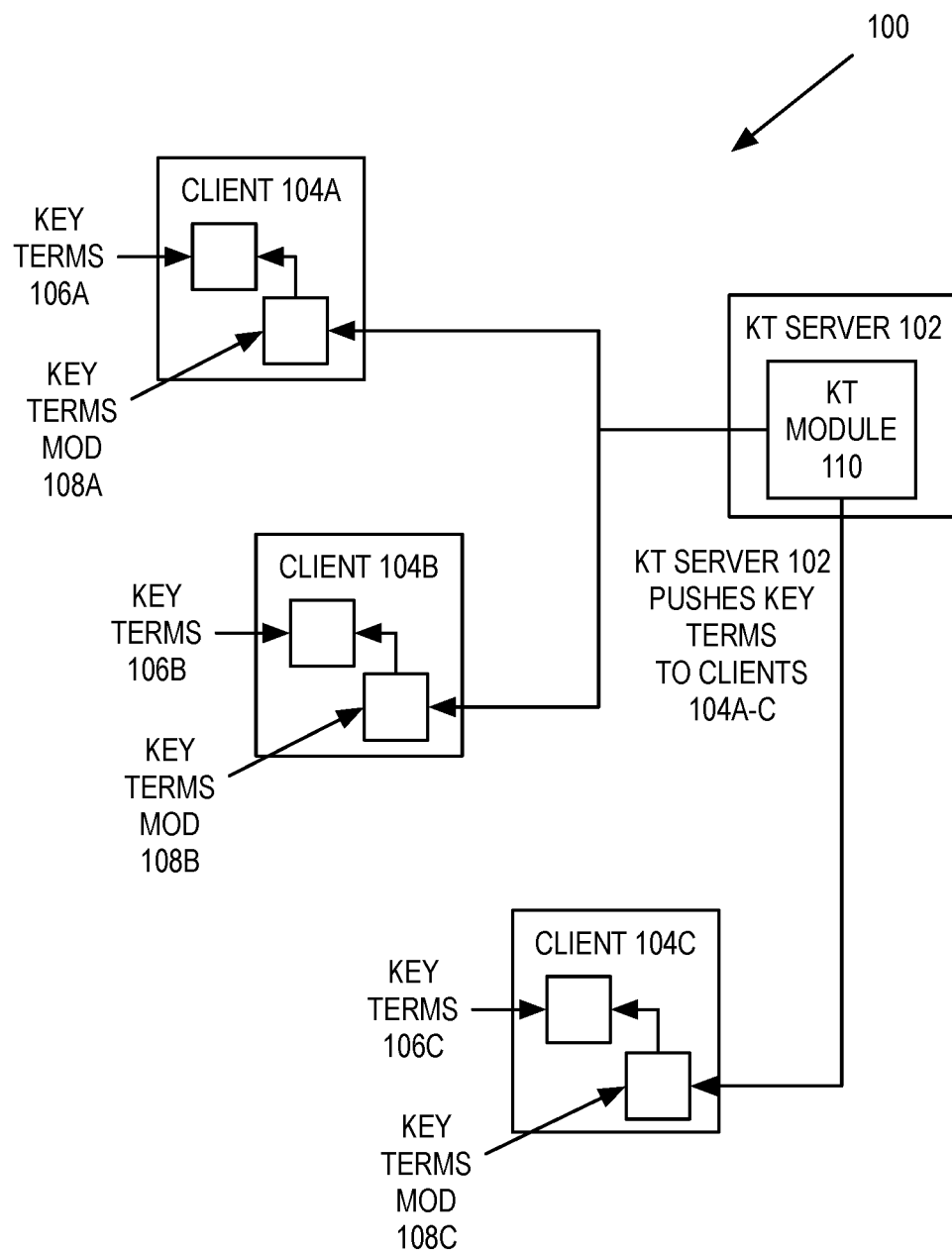
FIG. 1 is a block diagram of one embodiment of a system that generates and provides a list of key terms to multiple clients.

A method and apparatus of a device that links a term in an application running on a device to a predictive search query is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a device that links a term in an application running on a device to a predictive search query is described. In one embodiment, a client includes a set of key terms that is resident on the client. In this embodiment, each of the key terms is a term that a user may want to do a search for this term. For example and in one embodiment, a key term can be a term associated with news that is occurring, names of songs, names of movies, names of famous or interesting people, business names, and/or other types of terms. The client further includes one or more running applications that are presenting application terms through a user interface of that application. For example and in one embodiment, a messaging application presents application terms that represent a conversation between two or more people. The client compares the presented application terms with set of key terms to determine if any of the application terms match one of the key terms. The client can match the application term with the key term based on the text of the application and key terms (e.g., if the key term is a unambiguous key term) and/or can perform the matching based on a contextual analysis of the application term (e.g., if the key term is a ambiguous term).

If there is a match, the client highlights the matching application term. If the client receives an indication that the user has selected this matching application term, the client sends a search query for this application term to a search server, which performs a search using the search query over one or more search domains. The client receives the search results and presents the search results to the user. In one embodiment, the client presents the search results by overlapping a search results over the application. In another embodiment, the client presents the search results by displaying a separate window with the search results with a link back the application.

In one embodiment, a key terms server periodically sends the set of key terms to the client. The set of key terms can be specific to a locale and location for the client. The key terms server generates the set of key terms by analyzing tweets or other types of social media entries for each domain to determine key terms. In this embodiment, the key term server looks for the number of mentions for each of the terms in the social media entries. In one embodiment, and in addition to examining social media entries, the key term server could perform a specialized action for a search domain to extract key terms for that search domain. For example and in one embodiment, for the movies or music search domains, the key term server could extract key terms for these search domains based on a popularity of movies, actors/actresses, artists, song titles, album titles, and/or some other popularity metric for objects in these domains. Alternatively, the key term server could extract terms based on websites that users have engaged with as a result of search results.

FIG. 1 is a block diagram of one embodiment of a system 100 that generates and provides a list of key terms to multiple clients 104A-C. In FIG. 1, the system 100 includes a client 104A-C and key terms server 102 coupled by a network (not illustrated). In one embodiment, the key terms server 102 is a collection of one or more servers that periodically sends sets of key terms to the clients 104A-C. In one embodiment, the clients 104A-C and/or key terms server 102 can be personal computer, laptop, server, mobile device (e.g., smartphone, laptop, personal digital assistant, music playing device, gaming device, etc.), and/or any device capable requesting a search and/or displaying search results. In one embodiment, the clients 104A-C and/or key terms server 102 can be a physical or virtual device. In one embodiment, the smartphone can be a cellular telephone that is able to perform many functions of any one of clients 104A-C.

In one embodiment, the server 102 creates a list of key terms and pushes out these sets of key terms to each of the clients 104A-C. In one embodiment, a key term is a term that a user may want to do a search for this term. For example and in one embodiment, a key term can be a term associated with news that is occurring, names of songs, names of movies, names of famous or interesting people, business names, and/or other types of key terms. In one embodiment, the client 104A-C receives the set of key terms and uses these key terms to match occurrences of these terms in text that is presented by an application in the user interface to the user. For example and in one embodiment, if one of the key terms is "Star Trek Into Darkness," an application that is presently executing and displaying terms can use this (and other) key terms to see if one of these key terms matches the terms that the application is presenting to the user. If one of the key terms matches an application term, the application highlights that matching application term. The user can indicate to the application that the user wishes to do a search using the highlighted term, where the client 104A-C performs a search using the highlighted term and returns the search results to the user. For example in one embodiment, if the user clicks on the highlighted term, the client 104A-C sends a search request based on at least the highlighted term to a search server and receives the search results for that search request. The client 104A-C displays the search results for the user.

In one embodiment, the key term server 102 generates a set of key terms for each of the clients 104A-C and periodically updates these sets of key terms to the clients 104A-C. In this embodiment, the key term server 102 can generate different sets of key terms for different clients 104A-C based on at least the locale (e.g., default language used for the client 104A-C), the location, and/or different criteria. For example and in one embodiment, the key term server 102 can send one set of key terms to a client 104A configured to have a language of "US—English" and a different set of key terms to a client 104B configured to have a language of "French." Alternatively, the key term server 102 can send different sets of key terms based on the current location of one of the clients 104A-C. for example and in one embodiment, the key term server 102 sends one set of key terms to the client 104A if the client 104A is located in California and a different set of key terms if the client 104A is located in France.

Each teacher in the set of key terms, in one embodiment, includes term text, a threshold, base value, and a decay function. In this embodiment, the term text is one or more ordered words that represents something that the user may wish to search for. For example and in one embodiment, the term text can be a person, place, thing, idea that a user may wish to use for search. The threshold is a value that the client-side key term matching process uses to determine whether the term is highlighted or not. The base value is the value given if that term appears in the application text. In one embodiment the base value can be less than the threshold, where the match requires a boost to the base value based on a contextual analysis of the terms appearing in the neighborhood of the matching term. If the base value is equal to or greater than the threshold for that term, then this term is said to be an unambiguous term. If the base value, however, is less than the threshold, then this term is an ambiguous term that needs a contextual boost for this term to be highlighted. For example and in one embodiment, the term "Inside Out" may refer to the name of a movie or maybe just used in normal conversation. If an application presents the phrase "do you want to go see the movie inside out tonight?", the term "inside out" may be identified as the key term "Inside Out" as the name of the movie, where the search result can include movie times and locations for this movie. In another example, and embodiment, for the phrase "my mom says my room is inside out and I need to clean it now," the term "inside out" may not be identified as a key term because the contextual analysis of this phrase would not boost the term "inside out" so as to impart the meaning for a movie name. The decay function for the term is a function that computes a contribution for contextual terms based on distance from the key term. In one embodiment, each of the key terms can have a different decay function, where some of the key terms may have decay functions that decrease rapidly and other key terms may have decay functions that have a shallower decrease.

In one embodiment, the key turn server 102 includes a key term module 110 that generates the sets of key terms for one or more search domains (e.g., maps, media, wiki, sites, other, or another search domain). In one embodiment, each of the search domains has two types of words that this search domain can contribute to the set of key terms: unambiguous and ambiguous as described above. An unambiguous term does not necessarily need a contextual boost, where an ambiguous term would.

In one embodiment, the key term server 102 gathers the terms from the different search domains to assemble the set of key terms sent to the clients 104A-D. In this embodiment, the key term server 102 can analyze tweets or other social media entries for each search domain to determine key terms for these domains. In this embodiment, the key term server 102 looks for the number of mentions for each of the terms in the social media entries. For example and in one embodiment, the key term server 102 could examine each domain for terms using the same or different criteria. In one embodiment, in addition to examine social media entries, the key term server 102 could perform a specialized action for a search domain to extract key terms for that search domain. For example and in one embodiment, for the movies or music search domains, the key term server 102 could extract key terms for these search domains based on a popularity of movies, actors/actresses, artists, song titles, album titles, and/or some other popularity metric for objects in these domains. Alternatively, the key term server 102 could extract terms based on websites that users have engaged with as a result of search results.

Figure 2:
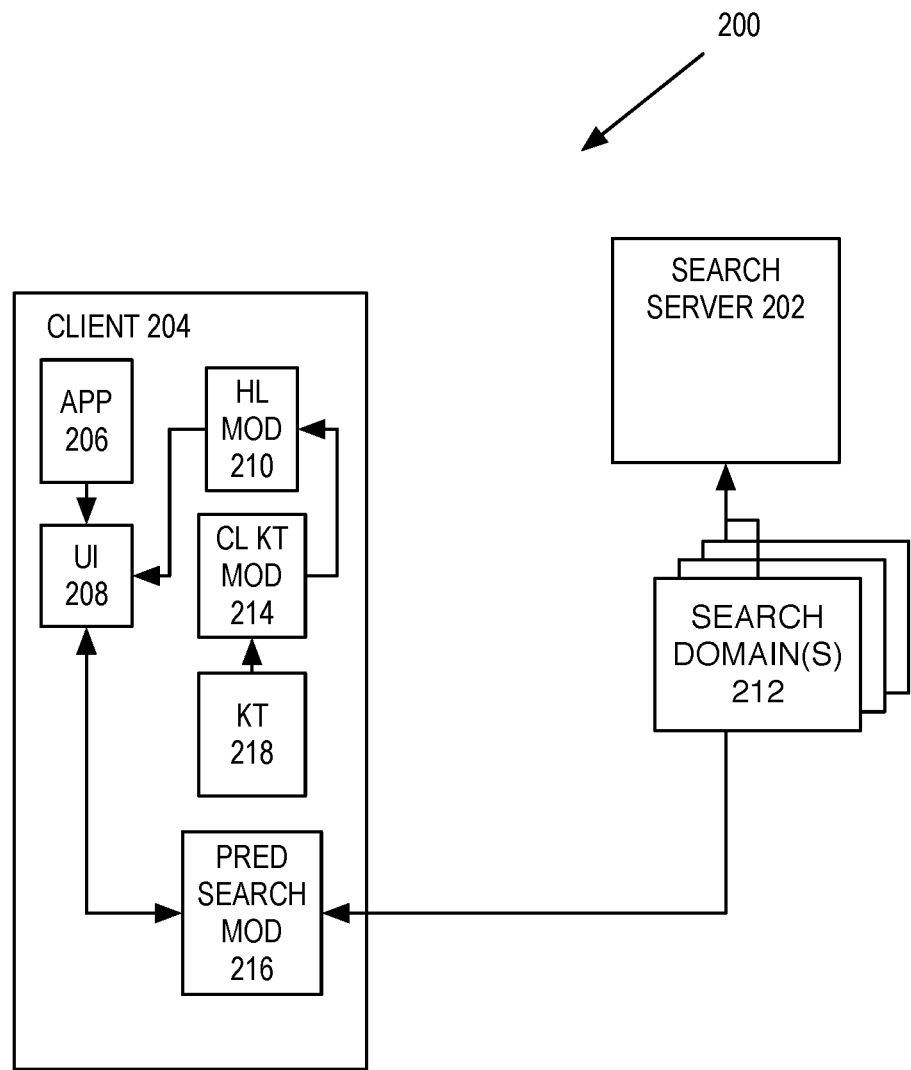
FIG. 2 is block diagram of one embodiment of a system that highlights key terms that is used to generate search results for those key terms.

FIG. 2 is block diagram of one embodiment of a system 200 that highlights key terms that is used to generate search results for those key terms. In FIG. 2, the system 200 includes a client 204 and search server 202 coupled by a network (not illustrated). In one embodiment, the search server 202 receives search requests from client 204 and returns search results back to those clients. In one embodiment, the clients 204 and/or search server 202 can be personal computer, laptop, server, mobile device (e.g., smartphone, laptop, personal digital assistant, music playing device, gaming device, etc.), and/or any device capable requesting a search and/or displaying search results. In one embodiment, the clients 204 and/or search server 202 can be a physical or virtual device. In one embodiment, the smartphone can be a cellular telephone that is able to perform many functions of any one of clients 204.

With the key terms installed on the client 204, the client 204 uses the key terms to determine which terms that are presented by an application should be highlighted for user. The client 204 includes the running application 206, user interface 208, highlight module 210, client key terms module 214, predictive search module 216, and key terms 216. In one embodiment, the client key terms module 214 provides the key terms 218 to the highlight module 210. In one embodiment, the application 206 is a running application that is presenting terms through the user interface 208. In this embodiment, the running application 206 can be a messaging application, word processing application, web browser, and/or any other type of application that presents terms to user through the user interface. The application 206 outputs a set of terms to the user interface 208. The highlight module 210 analyzes the set of application terms to determine which of the application terms is a key term. If the application term is a key term, the highlight module 210 highlights that key term. In addition, the highlight module associates the highlighted term with the search over the one or more search domains 212. In one embodiment, if the highlighted terms selected by the user (e.g., click done by the user or some other indicator), the predictive search module 216 sends a search request to the search server 202. The predictive search module 216 receives the search results and presents them to the user through the user interface 208. In one embodiment, the predictive search module 216 presents the search results by overlaying the search results over the application user interface in the user interface 208. Alternatively, the predictive search module 216 presents the search results in a separate window with a link back to the original window.

In one embodiment, the client 204 searches the application terms to determine if there's a potential match for one of the key terms. In this embodiment, if the client matches an application term with the text of a key term, the client 204 further determines if this application term should be highlighted. If this key term is an unambiguous key term, the client 204 highlights the term, because the unambiguous key term does not need the contextual analysis in order to highlight the matching term. If the key term is an ambiguous key term, the client 204 analyzes the context to determine if this application term should be highlighted. In one embodiment, the client 204 analyzes the tokens near the matching term. The client 204 can analyze the tokens to the left, to the right, or in either direction of the matching term. The client 204 can also the decay function associated with this matching key term to determine a contribution from the tokens that are in the neighborhood of the matching application term. The decay function associated with the key term determines a contribution for one of the tokens. In one embodiment, if one of the neighboring tokens matches a contextual term for the key term, the client 204 computes a contribution for that neighboring token using the decay function. In this embodiment, each of the key terms is associated with a set of contextual terms that can be used to boost the score of the key term. In one embodiment, the set of contextual terms for a key term is derived based on the search domain for this key term. For example and in one embodiment, the contextual terms for a movie search domain can be "movies," "see(n)," "watch," "ticket(s)," "movie time," and/or other words or phrases associated with the movies.

In one embodiment, a key term can be associated with one or more search domains. For example and in one embodiment, the term "Lord of the Rings" can be associated with multiple different search domains (e.g., books, music, movies, and/or news search domains). If the key term associated with multiple different search domains, the client 204 performs a contextual analysis for each of these search domains using different sets of contextual terms associated with each of the different search domains. For example and in one embodiment, if the key term has a base score of 0.5 and the threshold for the key term is 1.0, the client 204 would need to compute an additional boosting score of 0.5 to have this term highlighted. In one embodiment, if there are terms near the matching term that imply the context for a search domain, the score of the matching term will be raised. If this score is greater than or equal to the threshold, the matching term is highlighted.

In one embodiment, the client 204 can keep track of which of the highlighted terms were highlighted, engaged, and/or abandoned. In one embodiment, a key term could be matched with a highlighted application term many different times in the same or different applications. In this embodiment, the client 204 keeps tracks of the number of times a key term gets matched and highlighted to an application term. In addition, the client 204 keeps track of the number of times the text of a key term matches an application term, but is not boosted so that the application term is highlighted.

In addition, the client 204 keeps track of the number of times a user engages one or some of the search results presented to the user. In one embodiment, an engagement event occurs if the user interacts with one of the rendered results presented to the user using the search results. For example and in one embodiment, the user could click on a link that is presented for one of the rendered results. In another example, the user could click on the link and spend a time greater than a predetermined time interacting with the object (e.g., a website) referenced by that link (e.g., interacts with the referenced object for more than 60 seconds). In this example, the user may receive results directed towards a query search for the current U.S. President and click on a link that references a web page describing the latest presidential speech. If the user interacts with the website for more than a predetermined time (e.g., 60-90 seconds), the device would determine that the user engaged with the result represented by that link. In another embodiment, the user may ignore or abandon results rendered for the user. For example and in one embodiment, if a user clicks on a link presented for one of the rendered results, but navigates away from that website within a predetermined time (e.g., less than 60-90 seconds), the device determines that this is an abandonment event for that result.

In one embodiment, the client 204 could send each of these statistics for these events to a server. However, this may unnecessarily disclose private information of the user if the server uses the information right away. Instead and in one embodiment, the server receives these statistics from many different clients and only uses the results after a requisite number of clients or statistics have been sent to the server.

In one embodiment, with these statistics regarding the key terms (number of times matched, number of times almost matched, number of engagements, number of abandonments), the metadata for the key term (base score, threshold, decay function, and/or other metadata) can be refined. For example and in one embodiment, if a key term is highlighted often, but is engaged a high percentage of time that is highlighted, the threshold for this key term can be decreased or the key term can be made a unambiguous key term. As another example, if a key is highlighted infrequently, this key term can be pruned. If a key term is highlighted infrequently and the engagements for this key term is low it can be pruned. Conversely, if the engagements are high, the client 204 can also lower the threshold for this term so the term highlights more frequently.

Figure 3:
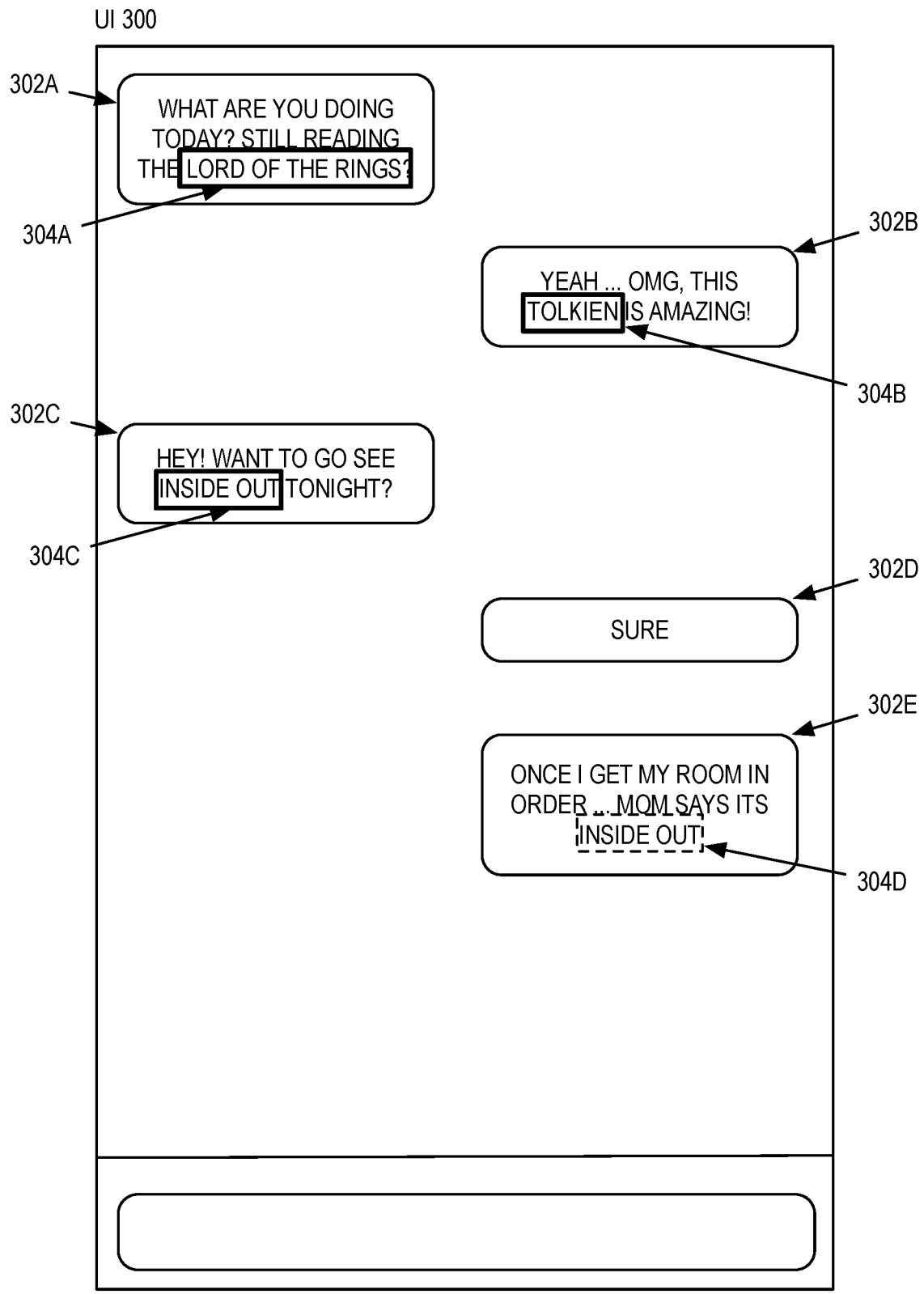
FIG. 3 is an illustration of one embodiment of a user interface with highlighted key terms.

FIG. 3 is an illustration of one embodiment of a user interface 300 with highlighted key terms. In FIG. 3, the user interface 300 is a user interface of a messaging application. The user interface 300 displays messages 302A-E between two people. The message bubble 302A for the first user displays the text "what you doing today? Still reading the Lord of the Rings?". In one embodiment, the client that displays the user interface 300 detects these application terms being displayed in the message bubble 302A and determines if any of the terms being displayed in the message bubble 302A our candidate terms to be highlighted. In this embodiment, the client determines that the term "Lord of the Rings" matches one of the key terms known to the client. If the application term "Lord of the Rings" is an unambiguous term, the client highlights this term as seen in 304A. On the other hand, if the application term "Lord of the Rings" is an ambiguous term, the client performs a contextual analysis to determine if this application term should be highlighted. If the client performs the contextual analysis for this application term, the client analyzes the tokens before and/or after this application term. For example and in one embodiment, the token "reading" that is two tokens away from the matching application term would add a contextual boost to the score of the matching application term. In one embodiment, the client determines that the "Lord of the Rings" is to be highlighted in the user interface 300 and the client highlights that term 304A.

The user interface 300 includes other message bubbles, such as message bubble 302B, that includes highlighted terms. The message bubble 302B includes the text "yeah . . . OMG this Tolkien is amazing!". The client determines that the term "Tolkien" is a highlightable term and highlights 304B this term. In one embodiment, because the term "Tolkien" likely refers to a well-known author, this term is an unambiguous term and the client does not perform the contextual analysis to determine if that term should be highlighted. The user interface further includes message bubbles 302C and 302E that each include the term "inside out". The message bubble 302C displays the text "Hey! Want to go see inside out tonight?". The client matches the key term "inside out" to the corresponding term in the message bubble 302C. Because the term "inside out" can be used in several different contexts, the client performs a contextual analysis of the message bubble 302C text to determine if the term "inside out" should be highlighted. In one embodiment, because the message bubble 302C text includes the terms "see" and "tonight", those two terms give a contextual boost to the matching key term "inside out". Thus, the matching key term "inside out" is highlighted.

In contrast, the message bubble 302E includes the text "Once I get my room in order . . . Mom says it's inside out". This message bubble 302E includes the key term "inside out". However, this message bubble 302E text lacks the contextual terms to boost the matching key term "inside out" such that the score of this matching key term is greater than the threshold for the matching key term. Thus, the matching key term "inside out" in the message bubble 302E is not highlighted by the client.

Figure 4A:
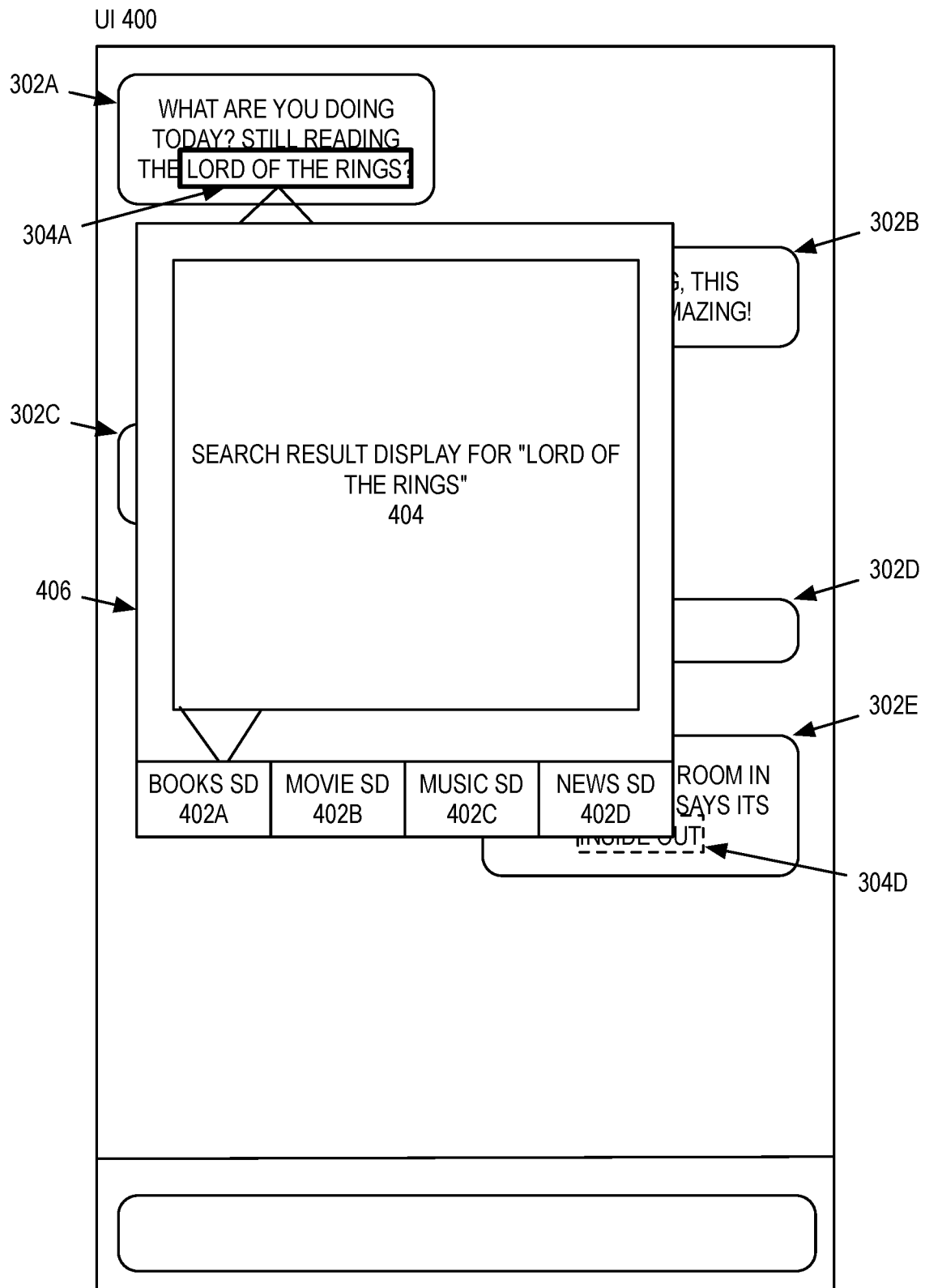
FIG. 4AB are illustrations of embodiments of a user interface with highlighted key terms and search results for a selected key term.

FIG. 4AB are illustrations of embodiments of user interfaces with highlighted key terms and search results for a selected key term. In FIG. 4A, the user interface 400 displays a search result pane 406 for the highlighted term "Lord of the Rings" 304A. Similar to the user interface illustrated in FIG. 3, the user interface 400 is a user interface for a messaging application. The user interface 400 includes the message bubbles 302A-302E that are displaying the same conversation as discussed in FIG. 3 above. In addition to the messaging application user interface elements as discussed in FIG. 3 above, user interface 400 includes the search result pane 406. In one embodiment, the search result pane 406 includes a window for display in the search result for the term "Lord of the Ring" for the books search domain 402A. In the window 404, a list of search results would be displayed, where each search result may include a link to a website or other resource accessible via the network that is a search result for the search query "Lord of the Rings" from the books search domain 402A. In addition, the search result pane 406 further displays buttons (or other UI selection elements) that can be used to display search results from other search domains. For example and in one embodiment, these buttons can be used to display search results for the movie search domain 402B, music search domain 402C, or the news search domain 402D. While in one embodiment, the search results are displayed for a messaging application and for a four domain search, in alternate embodiments, the search results can be displayed for a different type of application, and/or more or less numbers of search domains.

Figure 4B:
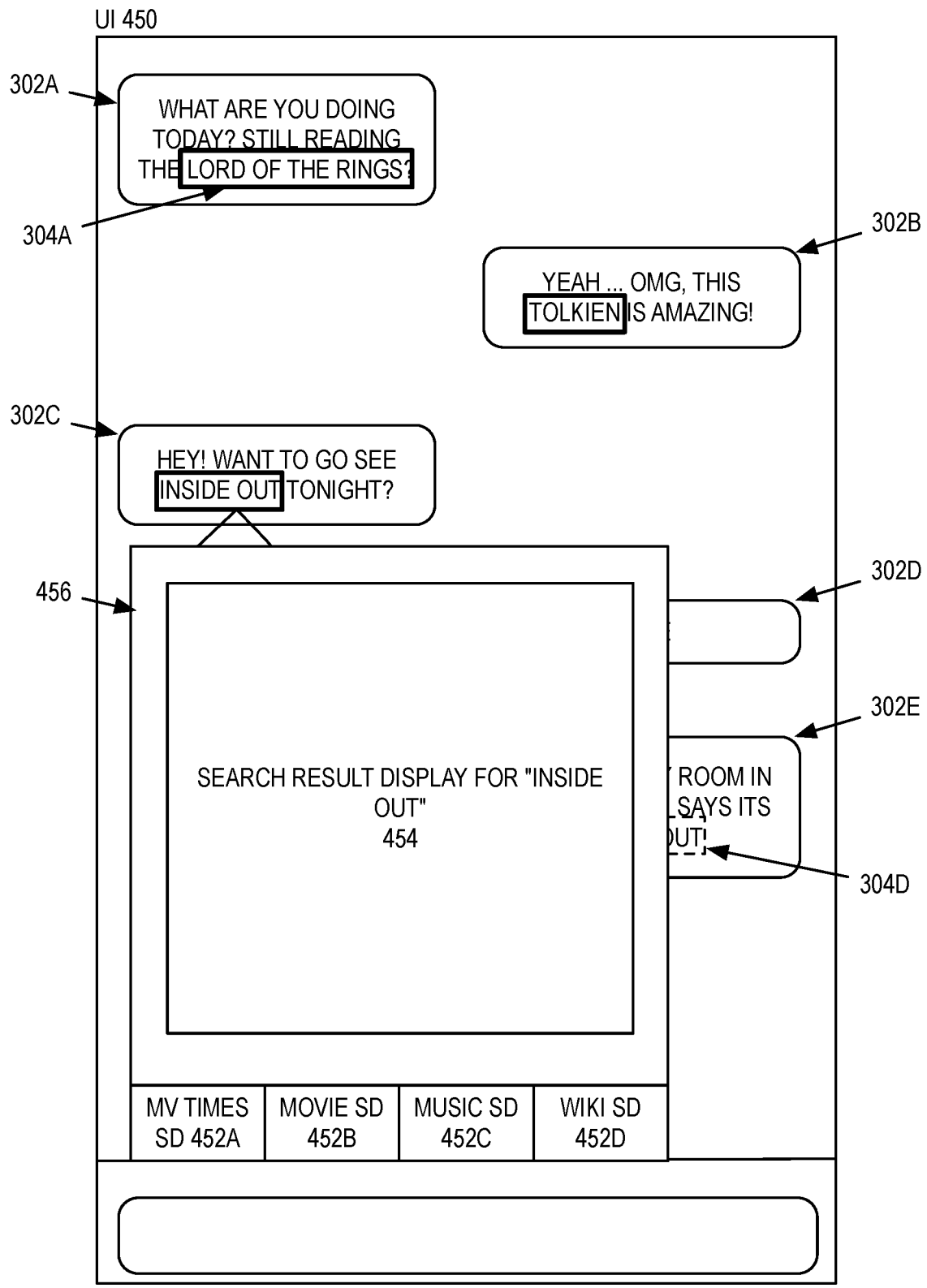

In FIG. 4B, the user interface 450 displays a search result pane 456 for the highlighted term "Inside Out" 304C. Similar to the user interface illustrated in FIGS. 3 and 4A, the user interface 450 is a user interface for a messaging application. The user interface 450 includes the message bubbles 302A-302E that is displaying the same conversation as discussed in FIG. 3 above. In addition to the messaging application user interface elements as discussed in FIG. 3 above, user interface 450 includes the search result pane 456. In one embodiment, the search result pane 456 includes a window for display in the search result for the term "Inside Out" for the books search domain 452A. In the window 454, a list of search results would be displayed, where each search result may include a link to a website or other resource accessible via the network that is a search result for the search query "Inside Out" from the movie times search domain 452A. In addition, the search result pane 456 further displays buttons (or other UI selection elements) that can be used to display search results from other search domains. For example and in one embodiment, these buttons can be used to display search results for the movie search domain 452B, music search domain 452C, or the Wiki search domain 452D. While in one embodiment, the search results are displayed for a messaging application and for a four domain search, in alternate embodiments, the search results can be displayed for a different type of application, and/or more or less numbers of search domains.

Figure 5:
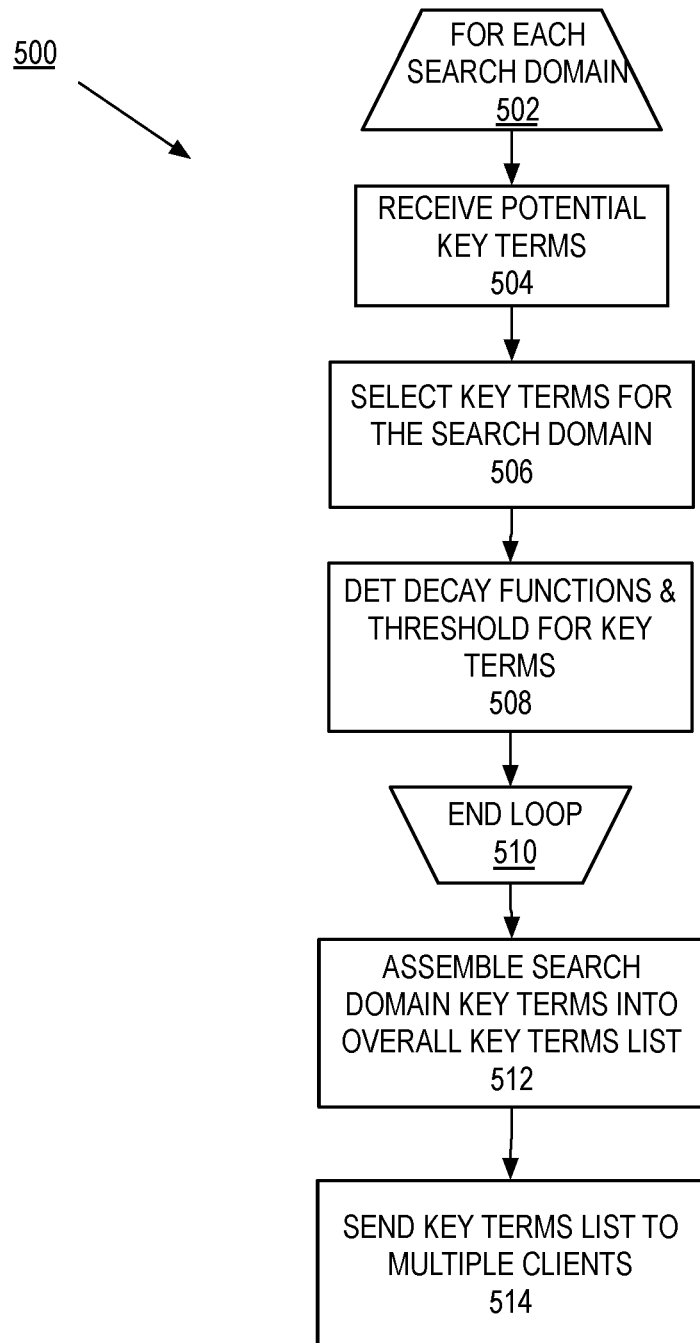
FIG. 5 is a flow diagram of one embodiment of a process to generate the key term list for multiple search domains.

FIG. 5 is a flow diagram of one embodiment of a process 500 to generate the key term list for multiple search domains. In one embodiment, process 500 is performed by a key term module 110 to generate a key term list from multiple search domains, such as the key term module 110 as described in FIG. 1 above. In FIG. 5, process 500 begins by performing a processing loop (blocks 502-510) over multiple search domains to extract key terms from each search domain. At block 504, process 500 receives potential key terms from that search domain. In one embodiment, process 500 analyzes social media entries for terms that are relevant to that search domain. For example and in one embodiment, if the search domain is for movies, process 500 analyzes the social media entries for terms related to movies (e.g., names of movies, actors/actresses, and/or other types of terms related to the movies). As another example, if the search domain is for music, process 500 analyzes the social media entries for terms related to music (e.g., trending artists/songs, concert information, music new releases, and/or any other types terms related to music). Furthermore, process 500 can gather potential key terms using search domain specific sources of terms. For example and in one embodiment, if the search domain is music, process 500 can retrieve terms related to the top or trending artists, albums, songs, music video and/or other types of music information form the music service. In addition, the potential key terms can be generated based on locale and location information. From this set of potential key terms for a search domain, process 500 selects the key terms at block 506. In one embodiment, process 500 selects the top N potential key terms to be the set of key terms for this search domain. In one embodiment, process 500 scores each of the potential key terms based on number of appearances, trending metrics, and/or other metrics and selects the top N terms based on these scores.

At block 508, process 500 determines the decay function, threshold, and base scores for each of the selected key terms. In one embodiment, context words (or keywords) have decay functions. To calculate the decay and score, process 500 finds the social media entries (e.g., Twitter, Facebook, and/or other types of social media) that contains these terms (e.g., "The Lord of the Rings", "The Martian", and/or other types of context words or keywords). Process 500 creates right and left language models. For example and in one embodiment, if a tweet is: "Lets go check out The Lord of The Ring movie this week", "lets go check out" would go into the left context model and "movie this week" would be in right context model. To find the base score of these context models, process 500 assigns a function of the probability of occurrence. For example and in one embodiment, if the term "movie" appears in 20% of the tweets containing the movie terms, process 500 assigns 4*0.2=0.8 as an initial base score. To find the decay, process 500 looks at how many times the "movie" appears at a distance 1 from the term, distance 2, and so on. In the above example, "movie" is at distance 1. Process 500 further determines if the number of occurrences decays linearly or exponentially on both the right and left. In the case of "movie," process 500 finds that the distance is independent of occurrence, so there is no decay. In addition, once process 500 has these initial scores and decay functions, process 500 can use manually graded tweets to optimize these scores. In addition, process 500 determines the contextual terms for this search domain. In one embodiment, the contextual terms are used to determine if an ambiguous matching key term should be highlighted as described in FIGS. 2 and 3 above. The processing loop ends at block 510.

At block 512, process 500 assembles the domain key terms into an overall key terms list. In one embodiment, the overall key terms list is specific to a particular locale and location. For example and in one embodiment, there can be an overall key terms list specific to the US and "US—English" locale, Europe and "French" or "German" locale, and/or other types of locale/language combinations. Process 500 sends out the key terms list to the multiple clients at block 512. In one embodiment, process 500 determines the locale and location for the clients and sends a corresponding key term list to that client. If a client moves to a different general location, process 500 sends a different key term list to that client. For example and in one embodiment, if a client is in California using a "US—English" locale, process 500 would send a key term list for California location and "US—English" locale. If a user took that client on a trip to France, process 500 would update the key term list for the France location and "US—English" locale. In one embodiment, process 500 receives an anonymous GPS location that locates the client to a relative area and not a pinpoint longitude/latitude location.

Figure 6:
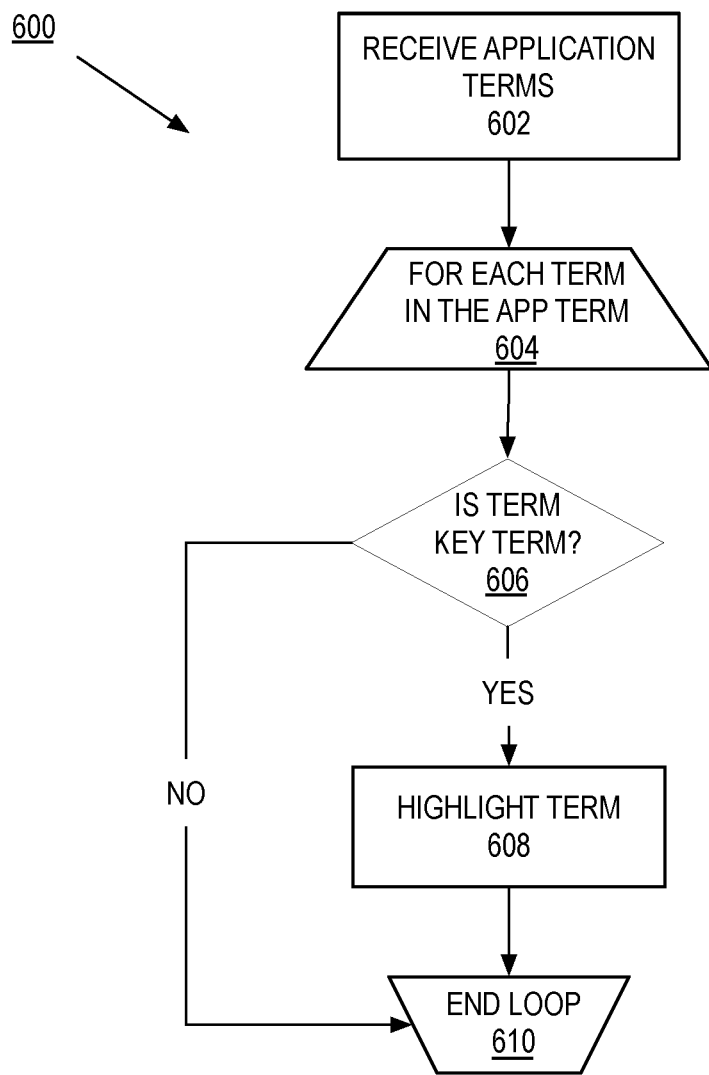
FIG. 6 is a flow diagram of one embodiment of a process to highlight key terms in a set of application terms.

With the set of key terms installed on a client, the client can use these key terms to determine whether any of the application terms should be highlighted. FIG. 6 is a flow diagram of one embodiment of a process 600 to highlight key terms in a set of application terms. In one embodiment, process 600 is performed by highlight term module to highlight key terms, such as the highlight term module 210 as described in FIG. 2 above. In FIG. 6, process 600 begins by receiving the application terms at block 602. In one embodiment, the application terms are the terms that are being presented by the application to the user through the application user interface. For example and in one embodiment, the application terms can be the term presented in the message bubbles 302A-E as described in FIG. 3 above. Process 600 performs a processing loop (blocks 604-610) to analyze each application term to determine if that application term is a match to one of the key terms. At block 606, process 600 determines if that application term is a key term at block 606. In one embodiment, process 600 determines if the application term is a match by comparing the text of the application term with the text of each of the ley terms to determine a match in the text of these terms. If there is a match in the text, process 600 determines if the matching key term is an unambiguous or ambiguous term. If the key term is an unambiguous term, process 600 indicates that this application term is a key term. If the key term is ambiguous term, process 600 performs a contextual analysis to determine if the application term is a key term. Determining if an application term is a key term is further described in FIG. 7 below.

If the application term is a key term, at block 606, process 600 highlights the term at block 608. In one embodiment, process 600 presents the highlighted term for the user interface to display. In another embodiment, process 600 marks this application term to be highlighted by the user interface. The processing loop ends at block 610.

Figure 7:
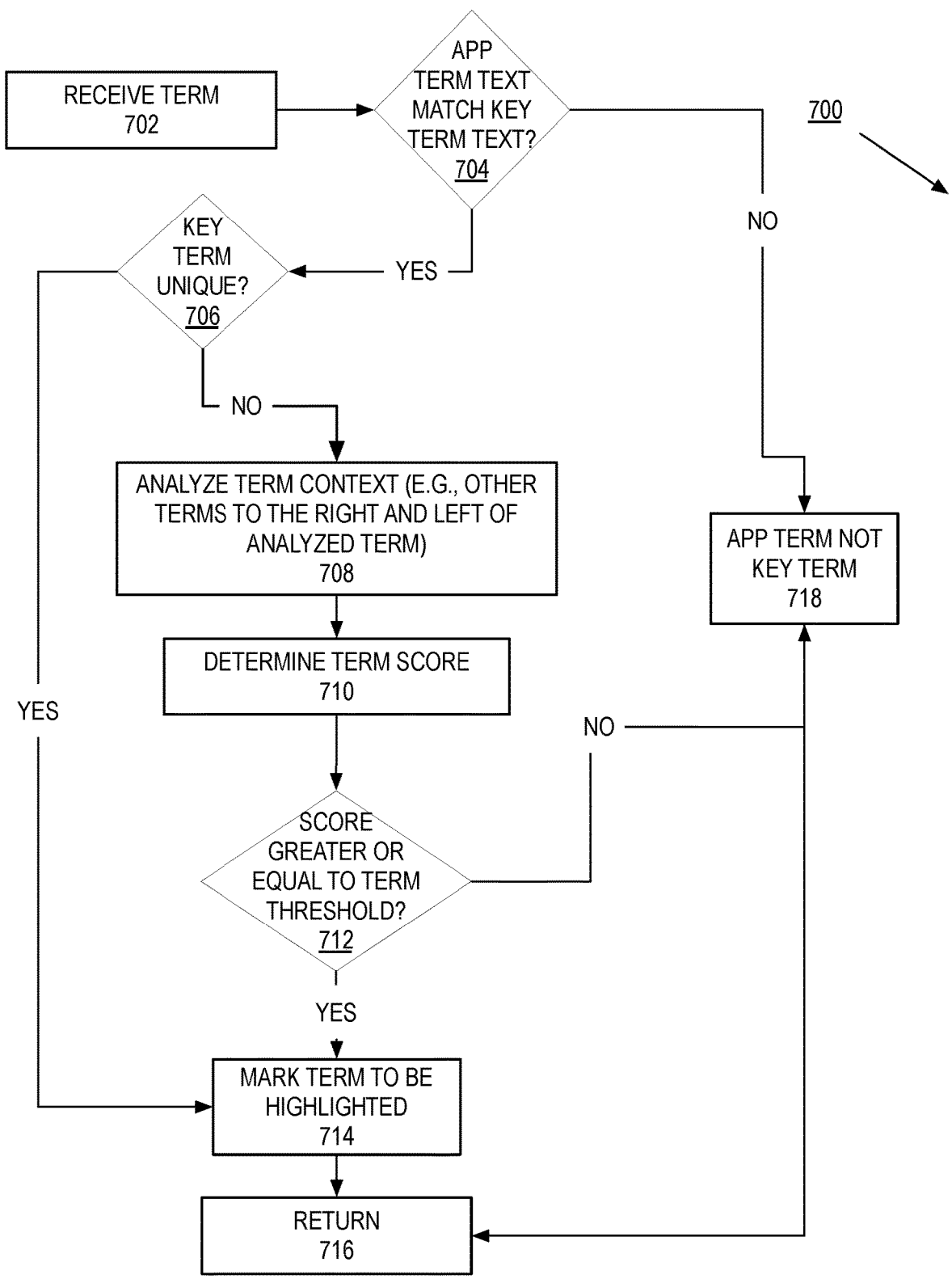
FIG. 7 is a flow diagram of one embodiment of a process to determine if an application term is a key term.

FIG. 7 is a flow diagram of one embodiment of a process 700 to determine if an application term is a key term. In one embodiment, process 700 is performed by a determine key term module to determine if an application term is a key term, such as the determine key term 1004 as described in FIG. 10 below. In FIG. 7, process 700 begins by receiving an application term at block 702. At block 704, process 700 determines if the application term text matches one of the key term text. While in one embodiment, process 700 determines that the text of the application term matches a key term text using an exact match, in alternate embodiments, process 700 using a fuzzy matching algorithm to determine a match. If the text application term does not match any of the key term text, execution proceeds to block 718 below. If the application term text does match a key term text, execution proceeds to block 706 below.

At block 706, process 700 determines if the matching key term is unambiguous. In one embodiment, an unambiguous term does not necessarily need a contextual boost for the matching application term to be highlighted. In contrast, an ambiguous term further undergoes contextual analysis in order for this term to be highlighted. If the matching key term is unambiguous, execution proceeds to block 714 below. If the matching key term is ambiguous, process 700 analyzes the context of the application term at block 708. In one embodiment, process 700 analyzes the tokens near the matching term for a contextual boost to the key term. Process 700 can analyze the tokens to the left, to the right, or in either direction of the matching term. Process 700 uses the decay function associated with this matching key term to determine a contribution from the tokens that are in the neighborhood of the matching application term. The decay function associated with the key term determines a contribution for one of the tokens. In one embodiment, if one of the neighboring tokens matches a contextual term for the key term, process 700 computes a contribution for that neighboring token using the decay function. In this embodiment, each of the key terms is associated with a set of contextual terms that can be used to boost the score of the key term. In one embodiment, the set of contextual terms for a key term is derived based on the search domain for this key term. For example and in one embodiment, the contextual terms for a movie search domain can be "movies," "see(n)," "watch," "ticket(s)," "movie time," and/or other words or phrases associated with the movies.

At block 710, process 700 determines the term score for the application term. In one embodiment, the term score is the base value of the application term plus any boosting score from the contextual analysis. Process 700 determines if the term score for the application is greater than the threshold for this term at block 712. In one embodiment, each of the key terms has a threshold that is used to determine if an application term matching this key term. In this embodiment, the threshold value can be adjusted based on user engagement for searches related to this term. If the term score is greater or equal to the threshold, execution proceeds to block 714 below. If term score is less than the threshold, execution proceeds to block 718 below.

At block 714, process 700 marks the application term to be highlighted. At block 718, process 700 determines that the application term is not to be marked for highlighting. At block 716, process 700 returns.

Figure 8:
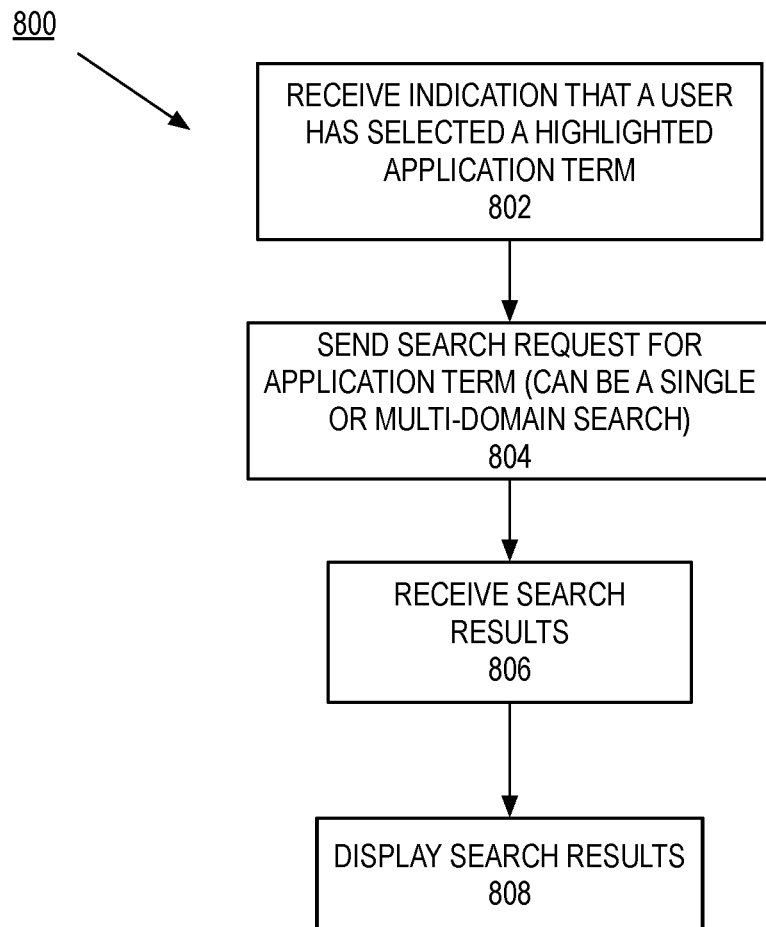
FIG. 8 is a flow diagram of one embodiment of a process to present search results for a key term.

FIG. 8 is a flow diagram of one embodiment of a process 800 to present search results for a key term. In one embodiment, process 800 is performed by a predictive search results module to determine if an application term is a key term, such as the predictive search results module 216. In FIG. 8, process 800 begins by receiving an indication that a user has selected a highlighted application term at block 802. In one embodiment, the user may clicked, touched, or used some other method of selecting a term through the user interface displaying the highlighted term. At block 804, process 800 sends the search request to a search server. In one embodiment, the search request can be a search request conducted over one or more search domains. Process 800 receives the search results at block 806. At block 808, process 800 displays the search results. In one embodiment, process 800 overlays the search results on a user interface as described in FIGS. 4A-B above. In another embodiment, process 800 displays the user interface in a separate window.

Figure 9:
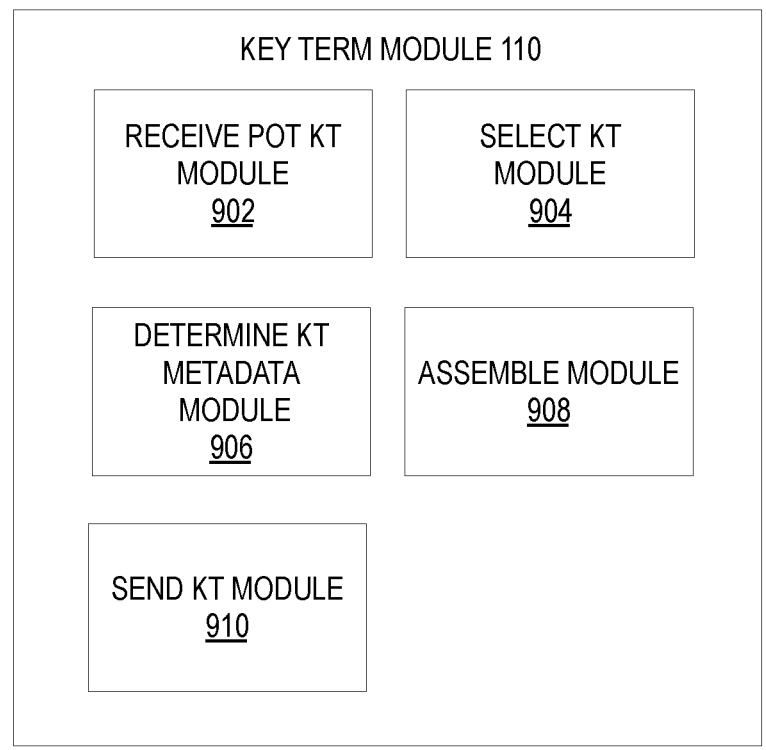
FIG. 9 is a block diagram of one embodiment of a key term module that generates the key term list for multiple search domains.
Figure 10:
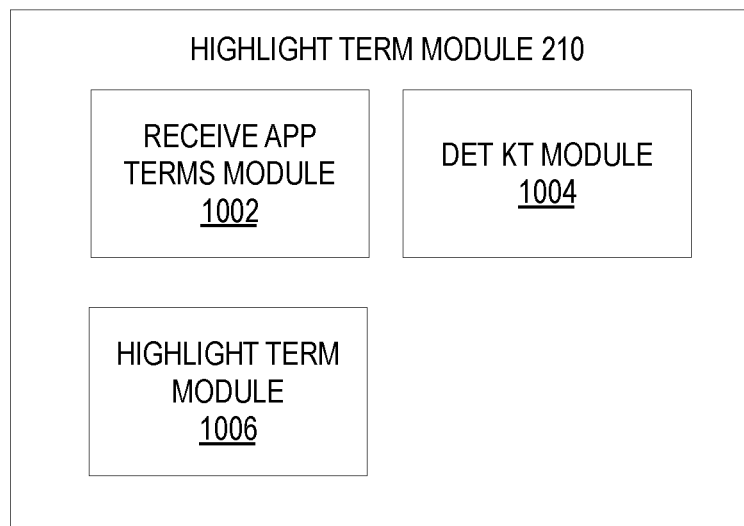
FIG. 10 is a block diagram of one embodiment of a highlight term module that highlights key terms in a set of application terms.

FIG. 9 is a block diagram of one embodiment of a key term module 110 that generates the key term list for multiple search domains. In one embodiment, the key term module 110 includes a receive potential key terms module 902, select key terms module 904, determine key terms metadata module 906, assemble module 908, and send key terms module 910. In one embodiment, the receive potential key terms module 902 receives the potential key terms as described in FIG. 5, block 504 above. The select key terms module 904 selects the key terms as described in FIG. 5, block 506 above. The determine key terms metadata module 906 determines the key terms metadata as described in FIG. 5, block 508 above. The assemble module 908 assembles the key terms as described in FIG. 5, block 512 above. The send key terms module 910 sends the key terms to the clients as described in FIG. 5, block 514 above. The FIG. 10 is a block diagram of one embodiment of a highlight term module 210 that highlights key terms in a set of application terms. In one embodiment, the highlight term module 210 includes a receive application terms module 1002, determine key terms module 1004, and highlight term module 1006. In one embodiment, the receive application terms module 1002 receives the application term as described in FIG. 6, block 602 above. The determine key terms module 1004 determines if an application term match one of the key terms as described in FIG. 6, block 606 above. The highlight term module 1006 highlights the matching application term as described in FIG. 6, block 608 above.

Figure 11:
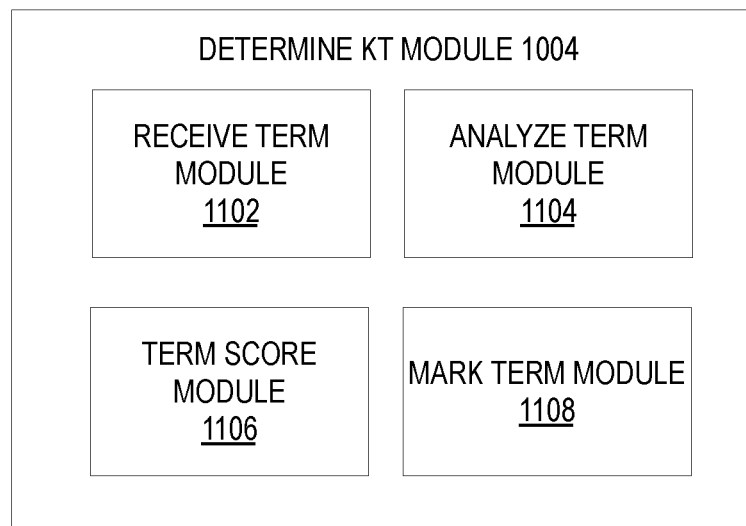
FIG. 11 is a block diagram of one embodiment of a determine key term module that determines if an application term is a key term.

FIG. 11 is a block diagram of one embodiment of a determine key terms module 1004 that determines if an application term is a key term. In one embodiment, the determine key terms module 1004 includes a receive term module 1102, analyze term module 1104, term score module 1106, and mark term module 1108. In one embodiment, the receive term module 1102 receive the application term as described in FIG. 7, block 702 above. The analyze term module 1104 performs a context analysis of the application term as described in FIG. 7, block 708 above. The term score module 1106 determines a term score for this application term as described in FIG. 7, block 710 above. The mark term module 1108 marks the term to be highlighted as described in FIG. 7, block 714 above.

Figure 12:
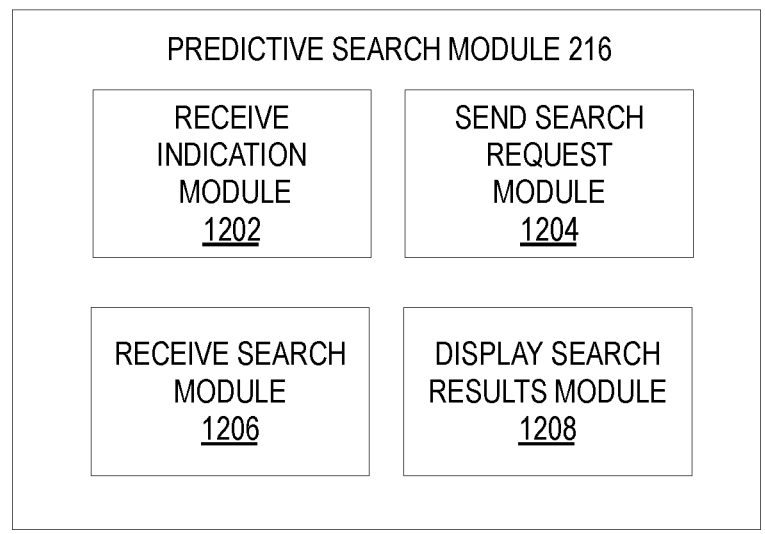
FIG. 12 is a block diagram of one embodiment of a predictive search results module that presents search results for a key term.

FIG. 12 is a block diagram of one embodiment of a predictive search results module 216 that presents search results for a key term. In one embodiment, the predictive search results module 216 includes a receive indication module 1202, send search request module 1204, receive search module 1206, and display search results module 1208. In one embodiment, the receive indication module 1202 receives an indication that a user has selected a highlighted application term as described in FIG. 8, block 802 above. The send search request module 1204 sends the search request as described in FIG. 8, block 804 above. The receive search module 1206 receives the search results as described in FIG. 8, block 806 above. The display search results module 1208 displays the search results as described in FIG. 8, block 808 above.

Figure 13:
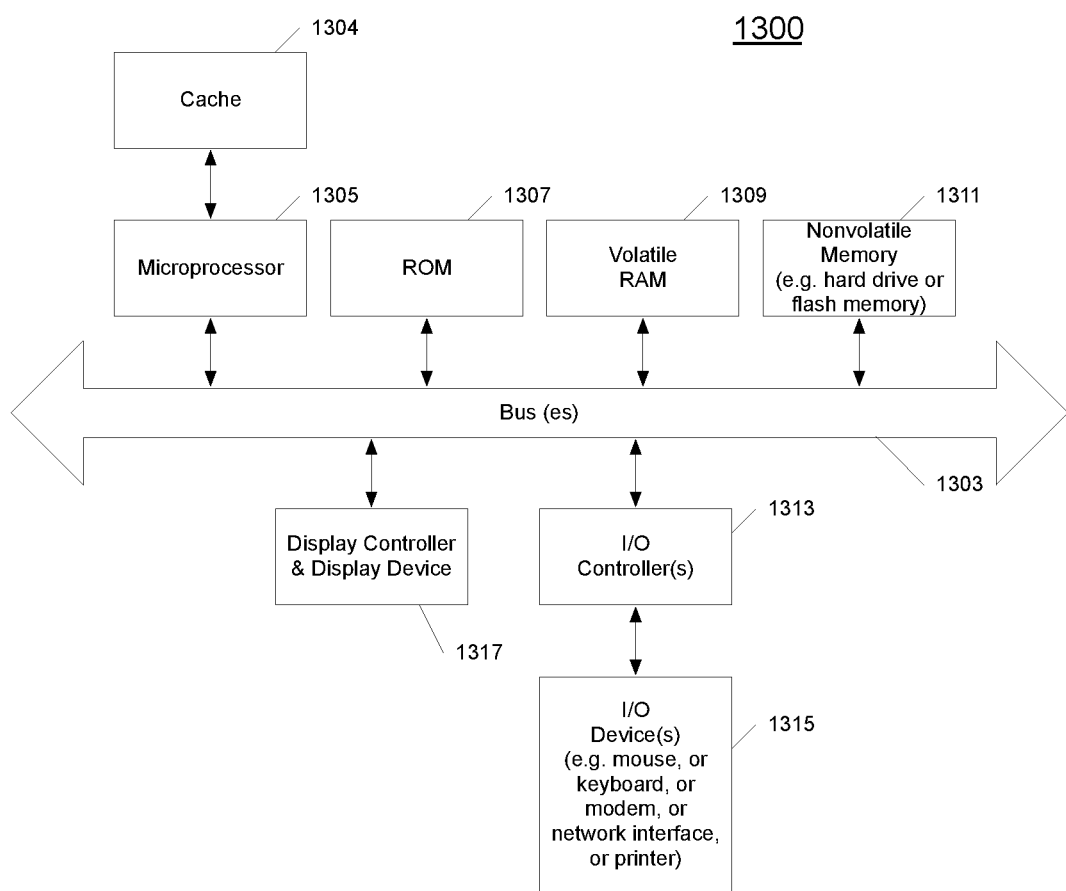
FIG. 13 illustrates one example of a typical computer system, which may be used in conjunction with the embodiments described herein.

FIG. 13 shows one example of a data processing system 1300, which may be used with one embodiment of the present invention. For example, the system 1300 may be implemented including clients 104A-C or 204 as shown in FIGS. 1 and 2, respectively. Note that while FIG. 13 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 13, the computer system 1300, which is a form of a data processing system, includes a bus 1303 which is coupled to a microprocessor(s) 1305 and a ROM (Read Only Memory) 1307 and volatile RAM 1309 and a non-volatile memory 1311. The microprocessor 1305 may include one or more CPU(s), GPU(s), a specialized processor, and/or a combination thereof. The microprocessor 1305 may retrieve the instructions from the memories 1307, 1309, 1311 and execute the instructions to perform operations described above. The bus 1303 interconnects these various components together and also interconnects these components 1305, 1307, 1309, and 1311 to a display controller and display device 1313 and to peripheral devices such as input/output (I/O) devices which may be mice, keyboards, modems, network interfaces, printers and other devices which are well known in the art. Typically, the input/output devices 1315 are coupled to the system through input/output controllers 1313. The volatile RAM (Random Access Memory) 1309 is typically implemented as dynamic RAM (DRAM), which requires power continually in order to refresh or maintain the data in the memory.

The mass storage 1311 is typically a magnetic hard drive or a magnetic optical drive or an optical drive or a DVD RAM or a flash memory or other types of memory systems, which maintain data (e.g. large amounts of data) even after power is removed from the system. Typically, the mass storage 1311 will also be a random access memory although this is not required. While FIG. 13 shows that the mass storage 1311 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 1303 may include one or more buses connected to each other through various bridges, controllers and/or adapters as is well known in the art.

Figure 14:
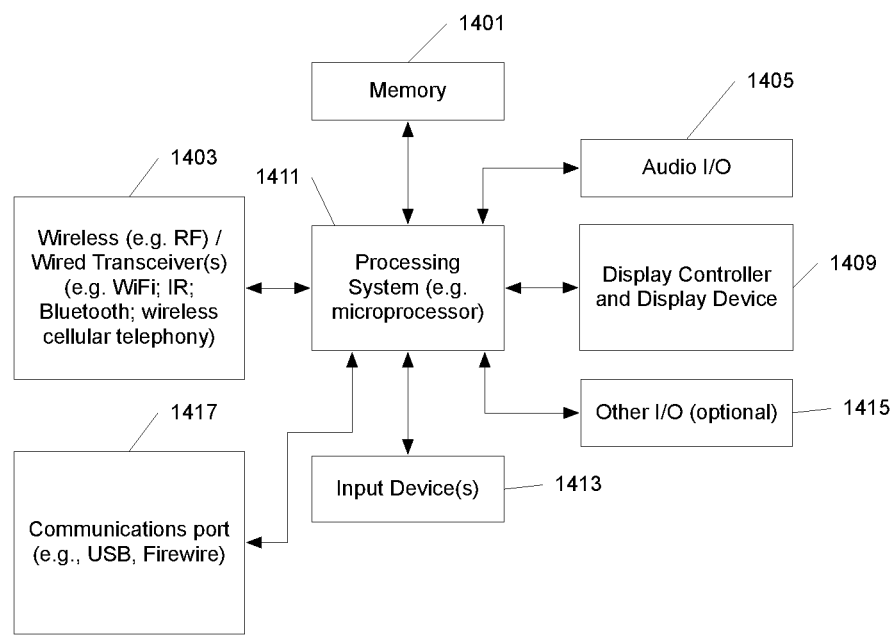
FIG. 14 shows an example of a data processing system, which may be used with one embodiment of the present invention.

FIG. 14 shows an example of another data processing system 1400 which may be used with one embodiment of the present invention. For example, system 1400 may be implemented as clients 104A-C or 204 as shown in FIGS. 1 and 2, respectively. The data processing system 1400 shown in FIG. 14 includes a processing system 1411, which may be one or more microprocessors, or which may be a system on a chip integrated circuit, and the system also includes memory 1401 for storing data and programs for execution by the processing system. The system 1400 also includes an audio input/output subsystem 1405, which may include a microphone and a speaker for, for example, playing back music or providing telephone functionality through the speaker and microphone.

A display controller and display device 1409 provide a visual user interface for the user; this digital interface may include a graphical user interface which is similar to that shown on a Macintosh computer when running OS X operating system software, or Apple iPhone when running the iOS operating system, etc. The system 1400 also includes one or more wireless transceivers 1403 to communicate with another data processing system, such as the system 1400 of FIG. 14. A wireless transceiver may be a WLAN transceiver, an infrared transceiver, a Bluetooth transceiver, and/or a wireless cellular telephony transceiver. It will be appreciated that additional components, not shown, may also be part of the system 1400 in certain embodiments, and in certain embodiments fewer components than shown in FIG. 14 may also be used in a data processing system. The system 1400 further includes one or more communications ports 1417 to communicate with another data processing system, such as the system 1500 of FIG. 15. The communications port may be a USB port, Firewire port, Bluetooth interface, etc.

The data processing system 1400 also includes one or more input devices 1413, which are provided to allow a user to provide input to the system. These input devices may be a keypad or a keyboard or a touch panel or a multi touch panel. The data processing system 1400 also includes an optional input/output device 1415 which may be a connector for a dock. It will be appreciated that one or more buses, not shown, may be used to interconnect the various components as is well known in the art. The data processing system shown in FIG. 14 may be a handheld computer or a personal digital assistant (PDA), or a cellular telephone with PDA like functionality, or a handheld computer which includes a cellular telephone, or a media player, such as an iPod, or devices which combine aspects or functions of these devices, such as a media player combined with a PDA and a cellular telephone in one device or an embedded device or other consumer electronic devices. In other embodiments, the data processing system 1400 may be a network computer or an embedded processing device within another device, or other types of data processing systems, which have fewer components or perhaps more components than that shown in FIG. 14.

At least certain embodiments of the inventions may be part of a digital media player, such as a portable music and/or video media player, which may include a media processing system to present the media, a storage device to store the media and may further include a radio frequency (RF) transceiver (e.g., an RF transceiver for a cellular telephone) coupled with an antenna system and the media processing system. In certain embodiments, media stored on a remote storage device may be transmitted to the media player through the RF transceiver. The media may be, for example, one or more of music or other audio, still pictures, or motion pictures.

The portable media player may include a media selection device, such as a click wheel input device on an iPod® or iPod Nano® media player from Apple, Inc. of Cupertino, Calif., a touch screen input device, pushbutton device, movable pointing input device or other input device. The media selection device may be used to select the media stored on the storage device and/or the remote storage device. The portable media player may, in at least certain embodiments, include a display device which is coupled to the media processing system to display titles or other indicators of media being selected through the input device and being presented, either through a speaker or earphone (s), or on the display device, or on both display device and a speaker or earphone(s). Examples of a portable media player are described in published U.S. Pat. No. 7,345,671 and U.S. published patent number 2004/0224638, both of which are incorporated herein by reference.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "requesting," "receiving," "determining," "comparing," "sending," "matching," "presenting," "performing," "adding," "selecting," "overlaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A non-transitory machine-readable medium containing executable program instructions which when executed by a data processing device cause the device to perform a method to link a term in an application running on a device to a predictive search query, the method comprising:
   receiving a plurality of key terms from a key terms server, wherein each of the plurality of key terms is associated with the predictive search query and the plurality of key terms are retrieved from a plurality of search domains;
   receiving a plurality of application terms from the running application;
   for each of the plurality of application terms,
      highlighting this application term when one of the plurality of key terms matches that application term, wherein the matching uses a contextual analysis for each of the plurality of key terms with a set of contextual terms associated with a corresponding search domain for that key term;
   receiving an indication that a matching key term has been selected by a user;
   requesting a query search to a search server using the predictive search query associated with the matching key term, wherein the predictive search query is performed using a subset of plurality of search domains and the subset of the plurality of search domains give at least one set of different search results for the matching key term;
   receiving a plurality of query search results associated with the plurality of search domains from the query search server; and
   presenting the plurality of query search results to the user of the device.

2. The machine-readable medium of claim 1, wherein each of the plurality of application terms is presented via a user interface of the application.

3. The machine-readable medium of claim 1, wherein each of the plurality of key terms includes a term text, base score, decay function, and a threshold.

4. The machine-readable medium of claim 3, wherein the matching comprises:
   matching the term text to a matching one of the plurality of key terms;
   performing the contextual analysis of the application term using the decay function of the matching key term;
   determining a term score of the application term using the base score of the matching key term; and
   comparing the term score with a threshold for the matching key score.

5. The machine-readable medium of claim 1, wherein the contextual analysis uses a set of contextual terms of a search domain associated with the matching key term.

6. The machine-readable medium of claim 1, wherein the matching key term is associated with multiple search domains.

7. The machine-readable medium of claim 1, wherein the presenting comprises:
   overlaying the search results over the user interface of the application.

8. The machine-readable medium of claim 1, wherein the presenting of the plurality of query search results includes presenting an indication of which of the plurality of search domains that a query search is associated with.

9. The machine-readable medium of claim 1, further comprising:
   tracking a number of times the user engages with one of the plurality of query search results.

10. The machine-readable medium of claim 1, further comprising:
    tracking a number of times the user abandons one of the plurality of query search results.

11. The machine-readable medium of claim 1, wherein each of the first and second pluralities of search domains includes one or more of books, music, movies, news, maps, media, wiki, and sites search domains.

12. The machine-readable-medium of claim 1, wherein the plurality of query search results is presented in a user interface that overlays the application.

13. The machine-readable-medium of claim 1, wherein the application is one of a messages application, a word processing application, and web browser.

14. A method to link a term in an application running on a device to a predictive search query, the method comprising:
    receiving a plurality of key terms from a key terms server, wherein each of the plurality of key terms is associated with the predictive search query and the plurality of key terms are retrieved from a first plurality of search domains;
    receiving a plurality of application terms from the running application; and
    for each of the plurality of application terms,
       highlighting this application term when one of the plurality of key terms matches that application term, wherein the matching uses a contextual analysis for each of the plurality of key terms with a set of contextual terms associated with a corresponding search domain for that key term;
    receiving an indication that a matching key term has been selected by a user;

requesting a query search to a search server using the predictive search query associated with the matching key term, wherein the predictive search query is performed using a plurality of search domains;

receiving a plurality of query search results associated with the s subset of the plurality of search domains from the query search server and the subset of the plurality of search domains give at least one set of different search results for the matching key term; and presenting the plurality of query search results to the user of the device.

15. The method of claim 14, wherein each of the plurality of application terms is presented via a user interface of the application.

16. The method of claim 14, wherein each of the plurality of key terms includes a term text, base score, decay function, and a threshold.

17. The method of claim 16, wherein the matching comprises:

matching the term text to a matching one of the plurality of key terms;

performing the contextual analysis of the application term using the decay function of the matching key term;

determining a term score of the application term using the base score of the matching key term; and comparing the term score with a threshold for the matching key score.

18. The method of claim 14, wherein the contextual analysis uses a set of contextual terms of a search domain associated with the matching key term.

19. The method of claim 14, wherein the matching key term is associated with multiple search domains.

20. The method of claim 14, wherein the presenting comprises:

overlaying the search results over the user interface of the application.

* * * * *